(12) United States Patent
Wu et al.

(10) Patent No.: US 11,729,701 B2
(45) Date of Patent: Aug. 15, 2023

(54) DISTRIBUTION NETWORK SYSTEM AND METHOD

(71) Applicant: REALTEK SEMICONDUCTOR CORP., Hsinchu (TW)

(72) Inventors: Jing-Jun Wu, Hsinchu (TW); Cui Ding, Hsinchu (TW); Zhao-Ming Li, Hsinchu (TW); Zuo-Hui Peng, Hsinchu (TW); Guo-Feng Zhang, Hsinchu (TW)

(73) Assignee: REALTEK SEMICONDUCTOR CORP., Hsinchu (TW)

( * ) Notice: Subject to any disclaimer, the term of this patent is extended or adjusted under 35 U.S.C. 154(b) by 237 days.

(21) Appl. No.: 17/140,793

(22) Filed: Jan. 4, 2021

(65) Prior Publication Data

US 2022/0104106 A1 Mar. 31, 2022

(30) Foreign Application Priority Data

Sep. 25, 2020 (CN) .......................... 202011021874.7

(51) Int. Cl.
*H04W 48/10* (2009.01)
*H04W 12/0431* (2021.01)
*H04W 84/18* (2009.01)

(52) U.S. Cl.
CPC ....... *H04W 48/10* (2013.01); *H04W 12/0431* (2021.01); *H04W 84/18* (2013.01)

(58) Field of Classification Search
CPC . H04W 48/10; H04W 12/0431; H04W 84/18; H04W 12/03; H04W 12/041; H04W 24/02; H04W 48/16; H04L 63/0442
See application file for complete search history.

(56) References Cited

U.S. PATENT DOCUMENTS 10,530,851 B1 * 1/2020 Hart ..................... H04W 40/246
2005/0243765 A1 11/2005 Frayer et al.
(Continued)

FOREIGN PATENT DOCUMENTS

| CN | 109246797 A | 1/2019 |
| TW | 202017350 A1 | 5/2020 |

*Primary Examiner* — Lan-Huong Truong
(74) *Attorney, Agent, or Firm* — Birch, Stewart, Kolasch & Birch, LLP

(57) ABSTRACT

A distribution network system and method. The distribution system has a plurality of communication channels and is connected to a mesh network. The mesh network uses one of the plurality of communication channels as a distributable network channel. The distribution network system includes an already-distributed network node and a to-be-distributed network node. The already-distributed network node is located in the mesh network and is configured to broadcast a mesh network beacon to the distributable network channel. The to-be-distributed node is configured to alternately monitor whether the mesh network beacon is detected on each communication channel. The to-be-distributed node outputs a network distribution request message to the already-distributed node according to the mesh network beacon, monitors whether a distribution network response message corresponding to the distribution network request message is detected on the distributable network channel, and joins the mesh network according to the distribution network response message.

10 Claims, 5 Drawing Sheets

(56) References Cited

U.S. PATENT DOCUMENTS

| | | | | |
|---|---|---|---|---|
| 2007/0248067 | A1* | 10/2007 | Banerjea | H04L 45/26 370/338 |
| 2016/0085972 | A1* | 3/2016 | Luo | G06F 21/602 713/153 |
| 2019/0349261 | A1* | 11/2019 | Smith | H04L 41/0806 |
| 2020/0084026 | A1* | 3/2020 | Reading | H04L 9/3239 |
| 2020/0169861 | A1* | 5/2020 | Hu | H04W 88/16 |

* cited by examiner

DISTRIBUTION NETWORK SYSTEM AND METHOD

CROSS-REFERENCE TO RELATED APPLICATION

This non-provisional application claims priority under 35 U.S.C. § 119(a) to Patent Application No. 202011021874.7 filed in China, P.R.C. on Sep. 25, 2020, the entire contents of which are hereby incorporated by reference.

BACKGROUND

Technical Field

The present invention relates to network technologies, and in particular, to a distribution network system and method.

Related Art

With the rapid development of network technologies, in addition to improving a network transmission speed, enabling a node waiting for network connection to be connected to a network is also an important issue in the network technologies. A process or an action of connecting the node waiting for network connection to the network may be referred to as "distribution network". In the present invention, this phrase is widely used for calling the above process or action.

Currently, common distribution network systems mostly distribute a network with a one-to-one connection. For example, when a system includes a control node that has already connected to the network and a plurality of to-be-distributed network nodes that have not connected to the network, the system requires the control node to distribute network connections to each to-be-distributed network node in a one-to-one manner, so that each to-be-distributed network node can be connected to the network. Therefore, such a distribution network system inevitably causes low efficiency on network distribution and poor user experience.

SUMMARY

In view of the above, the present invention provides a distribution network system and method.

According to some embodiments, the distribution network system has a plurality of communication channels, and is adapted to communicatively connect to a mesh network. The mesh network uses one of the plurality of communication channels as a distributable network channel. The distribution network system includes a first already-distributed network node, a first to-be-distributed network node and a control node. The first already-distributed network node is located in the mesh network, and is configured to broadcast a first mesh network beacon to the distributable network channel. The first to-be-distributed network node is configured to alternately monitor whether the first mesh network beacon is detected on each communication channel, wherein the first to-be-distributed network node outputs a first distribution network request message to the first already-distributed network node according to the first mesh network beacon, monitors whether a first distribution network response message corresponding to the first distribution network request message is detected on the distributable network channel, and joins the mesh network according to the first distribution network response message. The control node is configured to output the first distribution network response message.

According to some embodiments, the distribution network method is adapted to communicatively connect to a mesh network, and the mesh network uses one of a plurality of communication channels as a distributable network channel. The distribution network method includes the following steps: broadcasting a mesh network beacon to the distributable network channel by using an already-distributed network node, wherein the already-distributed network node is located in the mesh network; alternately monitoring whether the mesh network beacon is detected on each communication channel by using a to-be-distributed network node; outputting a distribution network request message from the to-be-distributed network node to the already-distributed network node according to the mesh network beacon; outputting a distribution network response message by using a control node, where the distribution network response message corresponds to the distribution network request message; monitoring whether the distribution network response message is detected on the distributable network channel by using the to-be-distributed network node; and adding the to-be-distributed network node to the mesh network according to the distribution network response message.

In conclusion, according to the distribution network system and method in some embodiments of the present invention, the distribution network system can assist the to-be-distributed network node in distributing the network through the already-distributed network node located in the mesh network, and can output the distribution network response message corresponding to the distribution network request message by using the control node, to achieve the function of distributing the network.

DETAILED DESCRIPTION

The present invention relates to a system. Although several preferred implementation modes of the present invention are described in this specification, it should be understood that the present invention may still be implemented in many ways and should not be limited to specific embodiments or specific ways of implementing the following features described below. In other cases, well-known details are not be described or discussed herein again to avoid obscuring the focus of the present invention.

In the specification, the term "connect" is described. In some embodiments, "connect" may be used for representing two or more components communicatively connected to each other through a wireless connection or a physical connection.

Figure 1:
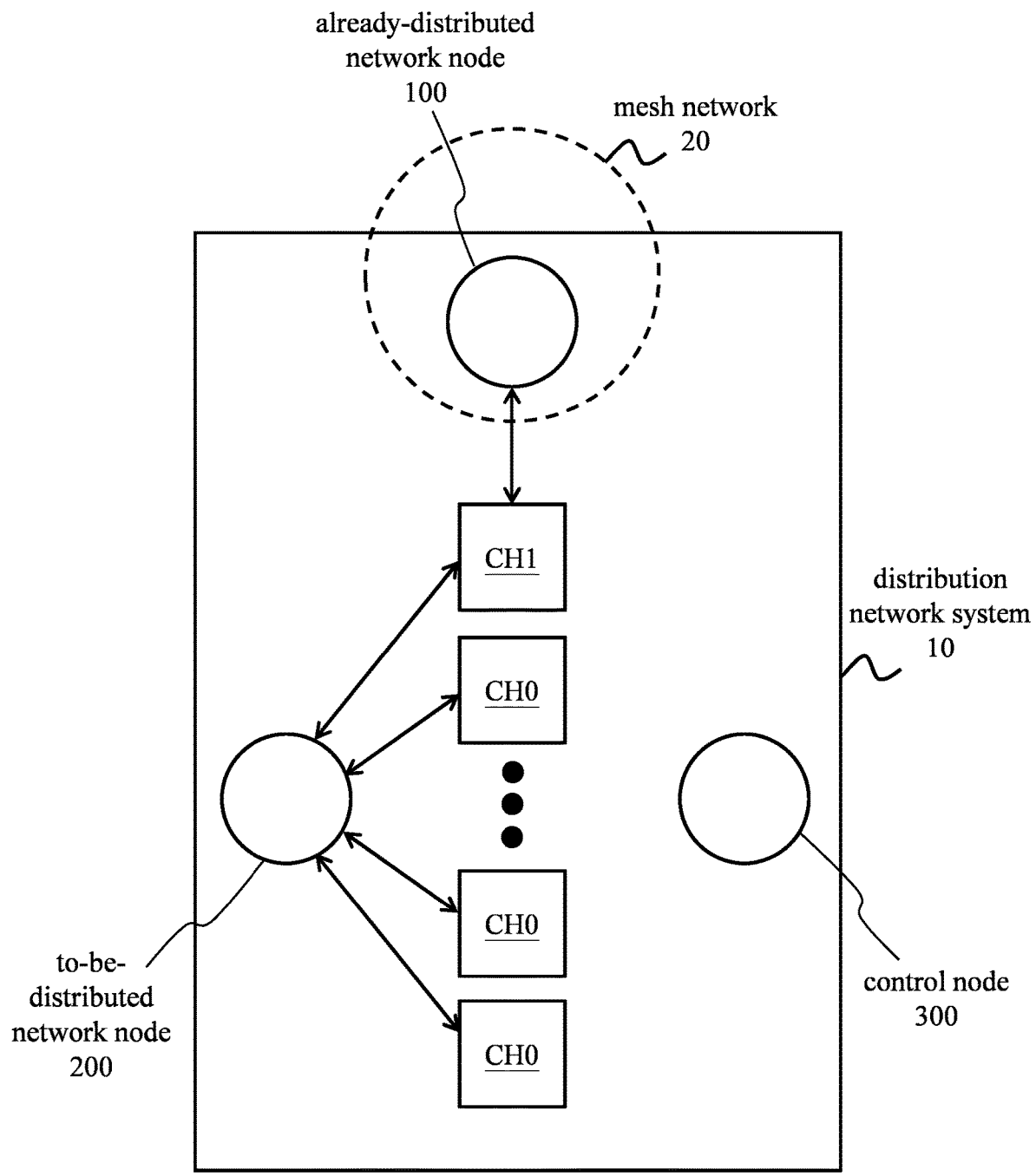
FIG. 1 is a schematic diagram of a distribution network system according to some embodiments of the present invention.
Figure 2:
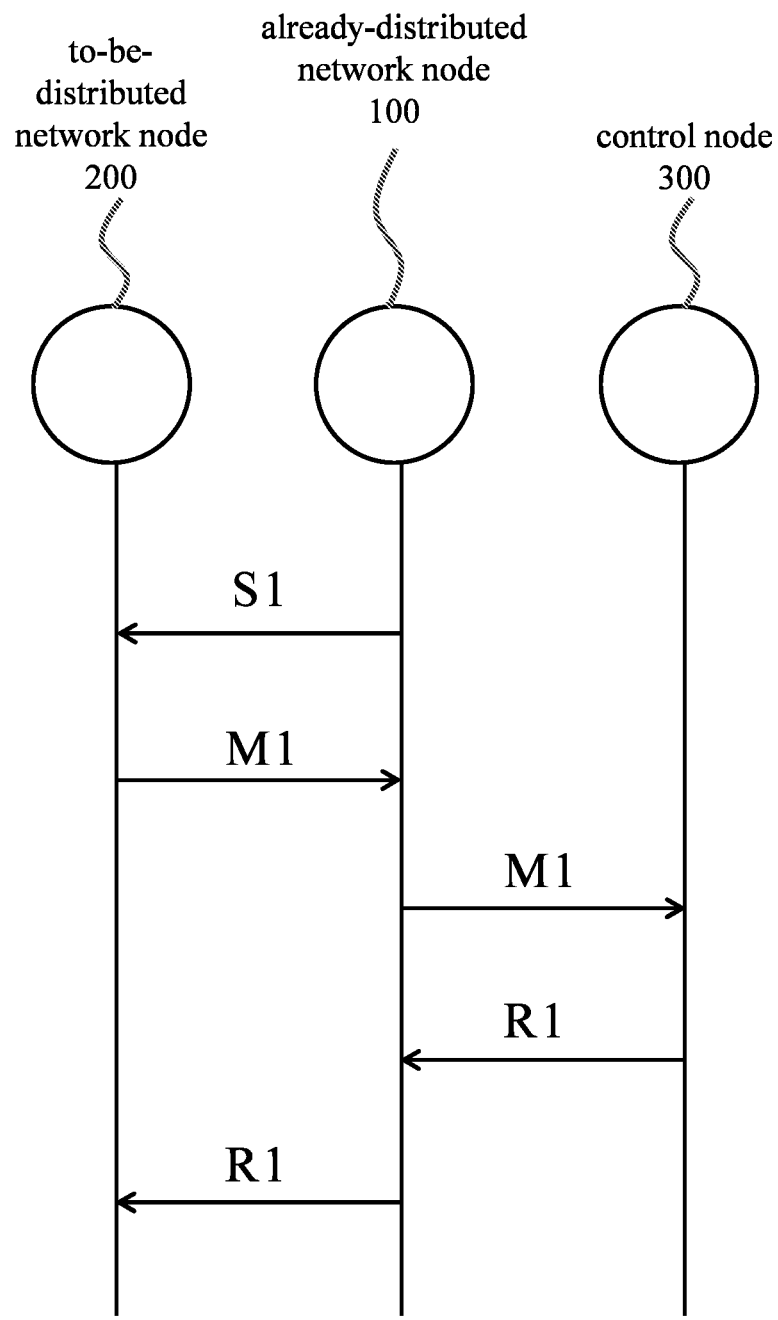
FIG. 2 is a schematic diagram of message transmission according to some embodiments of the present invention.

FIG. 1 is a schematic diagram of a distribution network system 10 according to some embodiments of the present invention, and FIG. 2 is a schematic diagram of message transmission according to some embodiments of the present invention. Referring to FIG. 1 and FIG. 2, in some embodiments, the distribution network system 10 has a plurality of communication channels CH0, and the distribution network system 10 is adapted to communicatively connect to a mesh network 20. The mesh network 20 uses one of the plurality of communication channels CH0 as a distributable network channel CH1. The distribution network system 10 includes an already-distributed network node 100, a to-be-distributed network node 200 and a control node 300. The already-distributed network node 100 is located in (i.e., a node that has already been added into) the mesh network 20, and the already-distributed network node 100 is configured to broadcast a mesh network beacon S1 to the distributable network channel CH1. The to-be-distributed network node 200 is configured to alternately (the alternately herein is not limited to an action of switching between channels according to a specific sequence or specific time interval) monitor whether the mesh network beacon S1 is detected on each communication channel CH0. When the to-be-distributed network node 200 successfully detects the mesh network beacon S1, the to-be-distributed network node 200 outputs a distribution network request message M1 to the already-distributed network node 100 according to the mesh network beacon S1, and the to-be-distributed network node 200 monitors whether a distribution network response message R1 corresponding to the distribution network request message M1 is sent back via the distributable network channel CH1. Then, the to-be-distributed network node 200 joins the mesh network 20 according to the distribution network response message R1. The control node 300 is configured to output the first distribution network response message R1.

In some embodiments, in the distribution network system 10, the already-distributed network node 100 is a node that has already completed the network distribution process, and the to-be-distributed network node 200 is a node that has not been distributed with network yet. The distribution network system 10 uses, for example, but not limited to, any of the communication channels CH0 to distribute the network to the to-be-distributed network node 200. For ease of description, in the specification, an example is given with the already-distributed network node 100 that has already joined the mesh network 20 and the mesh network 20 operates on the distributable network channel CH1. Specifically, when the mesh network 20 operates via other communication channels CH0, the communication channel CH0 operated by the mesh network 20 can be used to distribute the network connection to the to-be-distributed network node 200 in the specification. In some embodiments, the distribution network system 10 includes, for example, but not limited to, one or more already-distributed network nodes 100, and the distribution network system 10 can be adapted to one or more mesh networks 20. Different mesh networks 20 can operate in the respective corresponding communication channel CH0. Therefore, when the distribution network system includes a plurality of already-distributed network nodes 100, each already-distributed network node 100 can respectively broadcast the mesh network beacon S1 to the corresponding communication channel CH0 (i.e., the communication channel CH0 operated by the mesh network 20 in which the network node 100 is a part of it). In some embodiments, the distribution network system 10 includes, for example, but not limited to, one or more to-be-distributed network nodes 200. That is, each to-be-distributed network node 200 can monitor each of the communication channels CH0 respectively, and the each to-be-distributed network node 200 correspondingly outputs the distribution network request message M1 to the communication channel CH0 where the mesh network beacon S1 is detected.

In some embodiments, the distribution network system 10 can alternately monitor whether any mesh network beacon S1 that is broadcast by any of the already-distributed network nodes 100 is detected on each communication channel CH0. That is, the distribution network system 10 is not limited to monitor a single mesh network beacon S1 in each communication channel, but can monitor a plurality of different mesh network beacons S1. In an example, if a monitoring cycle represents the time that the to-be-distributed network node 200 go through all the communication channels CH0, it means in each monitoring cycle the to-be-distributed network node 200 can monitor the distributable network channel CH1 once. It is noted that the to-be-distributed network node 200 can generate, for example, but not limited to, the corresponding distribution network request message M1 according to the mesh network beacon S1 obtained by monitoring the distributable network channel CH1 in a previous monitoring cycle. The to-be-distributed network node 200 can alternatively generate the corresponding distribution network request message M1 according to the mesh network beacon S1 obtained by monitoring the distributable network channel CH1 in current monitoring cycle. In some embodiments, the mesh network beacon S1 includes a mesh network identification message (Mesh ID) of the mesh network 20 corresponding to the already-distributed network node 100. Therefore, the to-be-distributed network node 200 can output the distribution network request message M1 to the already-distributed network node 100 according to the mesh network beacon S1, and the to-be-distributed network node 200 monitors whether distribution network response message R1 corresponding to the distribution network request message M1 is detected on the distributable network channel CH1. When the to-be-distributed network node 200 monitors the distributable network channel CH1, the to-be-distributed network node 200 can join the mesh network 20 according to the received distribution network response message R1, where the distribution network response message R1 is outputted by the control node 300. Specifically, when the to-be-distributed network node 200 joins the mesh network 20, the to-be-distributed network node 200 completes the network distribution process. That is, the to-be-distributed network node 200 can become another already-distributed network node 100. It is noted that when the to-be-distributed network node 200 joins the mesh network 20, the to-be-distributed network node 200 is not limited to be connected to the mesh network 20 in a specific communication connection manner, which means, the relationship between the to-be-distributed network node 200 and other nodes of the mesh network 20 is not limited. For example, the to-be-distributed network node 200 can be used as a parent node, a child node, an ancestor node or a descendant node of the already-distributed network node 100 or a node on another connection branch of the mesh network 20 in parallel with the already-distributed network node 100.

Referring to FIG. 2, in some embodiments, after the already-distributed network node 100 receives the distribution network request message M1 outputted by the to-be-distributed network node 200, the already-distributed network node 100 forwards the distribution network request message M1 to the control node 300. The control node 300 generates the distribution network response message R1 according to the distribution network request message M1, and the control node 300 transmits the distribution network response message R1 back to the already-distributed network node 100. The already-distributed network node 100 broadcasts the received distribution network response message R1 to the distributable network channel CH1. Therefore, the to-be-distributed network node 200 can possibly detect the distribution network response message R1 on the distributable network channel CH1. It is noted that a manner that the control node 300 transmits the distribution network response message R1 back to the already-distributed network node 100 is, for example, but not limited to, transmitting the distribution network response message R1 back to the already-distributed network node 100 in a unicast manner or other transmission manners.

In some embodiments, the to-be-distributed network node 200 monitors the distributable network channel CH1 according to a specific stay duration, and the to-be-distributed network node 200 adjusts, according to whether the mesh network beacon S1 is received on the distributable network channel CH1, the stay duration (i.e., stay durations for monitoring these channels may be the identical or different) in which the distributable network channel CH1 is monitored. Specifically, when the to-be-distributed network node 200 alternately monitors each communication channel CH0, the each communication channel CH0 corresponds to a stay duration. Using the distributable network channel CH1 as an example, when the to-be-distributed network node 200 receives the mesh network beacon S1 on the distributable network channel CH1 (which indicates that the mesh network 20 has a relatively high likelihood to operate via this distribution network channel), and the to-be-distributed network node 200 extends the stay duration for monitoring the distributable network channel CH1. On the contrary, when the to-be-distributed network node 200 fail to receive the mesh network beacon S1 on the distributable network channel CH1 (which indicates that the mesh network 20 has a relatively low likelihood to operate via this distribution network channel), and the stay duration for the to-be-distributed network node 200 to monitor the distributable network channel CH1 is maintained at an default value. It is noted that the to-be-distributed network node 200 adjusts, for example, but not limited to, a stay duration for monitoring the distributable network channel CH1 in the next monitoring cycle, or adjusts the stay duration for monitoring the distributable network channel CH1 in current monitoring cycle. Similarly, a stay duration corresponding to each communication channel CH0 is correspondingly adjusted according to whether the to-be-distributed network node 200 successfully detects the mesh network beacon S1 on the respective communication channel CH0, and details are not described again.

In some embodiments, the to-be-distributed network node 200 stores a distributable network list, and the distributable network list is configured to record the mesh network beacon S1 and the distributable network channel CH1. The to-be-distributed network node 200 outputs the distribution network request message M1 to the distributable network channel CH1 according to the distributable network list. Specifically, the distributable network list is configured to record each mesh network beacon (for example, the mesh network beacon S1 or other mesh network beacons) monitored by the to-be-distributed network node 200 on the each communication channel CH0. That is, the distributable network list records, for example, but not limited to, the mesh network beacon S1 and the distributable network channel CH1, and other mesh network beacons monitored on other communication channels CH0 can also be added to the distributable network list. Therefore, the to-be-distributed network node 200 can output the distribution network request message M1 to the distributable network channel CH1 according to the distributable network list, or outputs other distribution network request messages to the corresponding communication channels CH0 (for example, a second distribution network request message M2 and a third distribution network request message M3 described in subsequent embodiments) according to the distributable network list.

In some embodiments, the distribution network system 10 is further adapted to a wireless access point (not shown in the figure), and the wireless access point operates on the distributable network channel CH1. The mesh network 20 is communicatively connected to the control node 300 through the wireless access point. In some embodiments, the distribution network system 10 can include a wireless access point. In some embodiments, the distribution network system 10 is further adapted to an external cloud network. The cloud network can be configured to implement communication connection between the control node 300 and the wireless access point.

In some embodiments, the to-be-distributed network node 200 stores a public key and a private key that correspond to each other. The distribution network request message M1 includes to-be-distributed network data and the public key. The control node 300 generates distribution network data according to the to-be-distributed network data, the control node 300 uses the public key to encrypt the distribution network data, to generate encrypted data, and the control node 300 generates the distribution network response message R1 according to the to-be-distributed network data and the encrypted data. The to-be-distributed network node 200 receives the distribution network response message R1 according to the to-be-distributed network data in the distribution network response message R1, and the to-be-distributed network node 200 uses the private key to decrypt the encrypted data in order to obtain the distribution network data. The to-be-distributed network node 200 joins the mesh network 20 according to the distribution network data. Specifically, the to-be-distributed network node 200 transmits the to-be-distributed network data and the public key to the control node 300 by using the distribution network request message M1, and the control node 300 encrypts a part of the distribution network response message R1 by using the public key. Therefore, the to-be-distributed network node 200 can use its own private key to decrypt a part of the distribution network response message R1 that is encrypted by the public key. It is noted that, because the already-distributed network node 100 forwarding messages does not own a private key, the distribution network system 10 can prevent the distribution network response message R1 from being decrypted by the already-distributed network node 100. Therefore, the distribution network system 10 has a function of encrypting the distribution network.

In some embodiments, the to-be-distributed network data includes a Media Access Control address (MAC address) of the to-be-distributed network node 200, and the distribution network response message R1 also includes the MAC address of the to-be-distributed network node 200. Therefore, the to-be-distributed network node 200 can determine whether the distribution network response message R1 is correct according to the MAC address in the distribution network response message R1. That is, the to-be-distributed network node 200 can determine whether the target of the distribution network response message R1 is the to-be-distributed network node 200 itself and is for network distribution. For the distribution network response message R1, in some embodiments, the distribution network response message R1 includes an unencrypted part and an encrypted part. The control node 300 uses the to-be-distributed network data and a part of the distribution network data as an unencrypted part of the distribution network response message R1, and the encrypted data is used as an encrypted part of the distribution network response message R1. The unencrypted part includes the MAC address of the to-be-distributed network node 200 and an SSID of the mesh network 20, and the encrypted part includes a password of the mesh network 20. Specifically, the encrypted data is obtained by encrypting a part of the distribution network data, the distribution network data includes the SSID and the password of the mesh network 20, and the password is encrypted to be an encrypted part of the distribution network response message R1.

Figure 3:
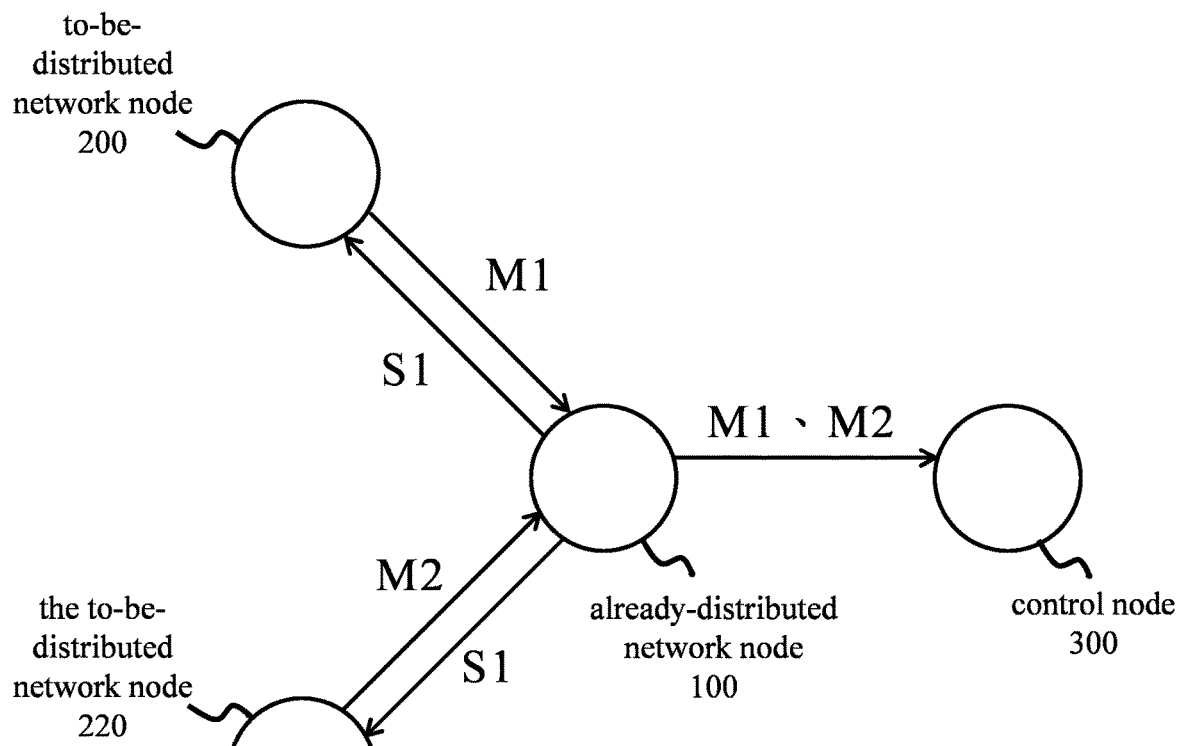
FIG. 3 is a schematic diagram of a distribution network request of the distribution network system according to some embodiments of the present invention.
Figure 4:
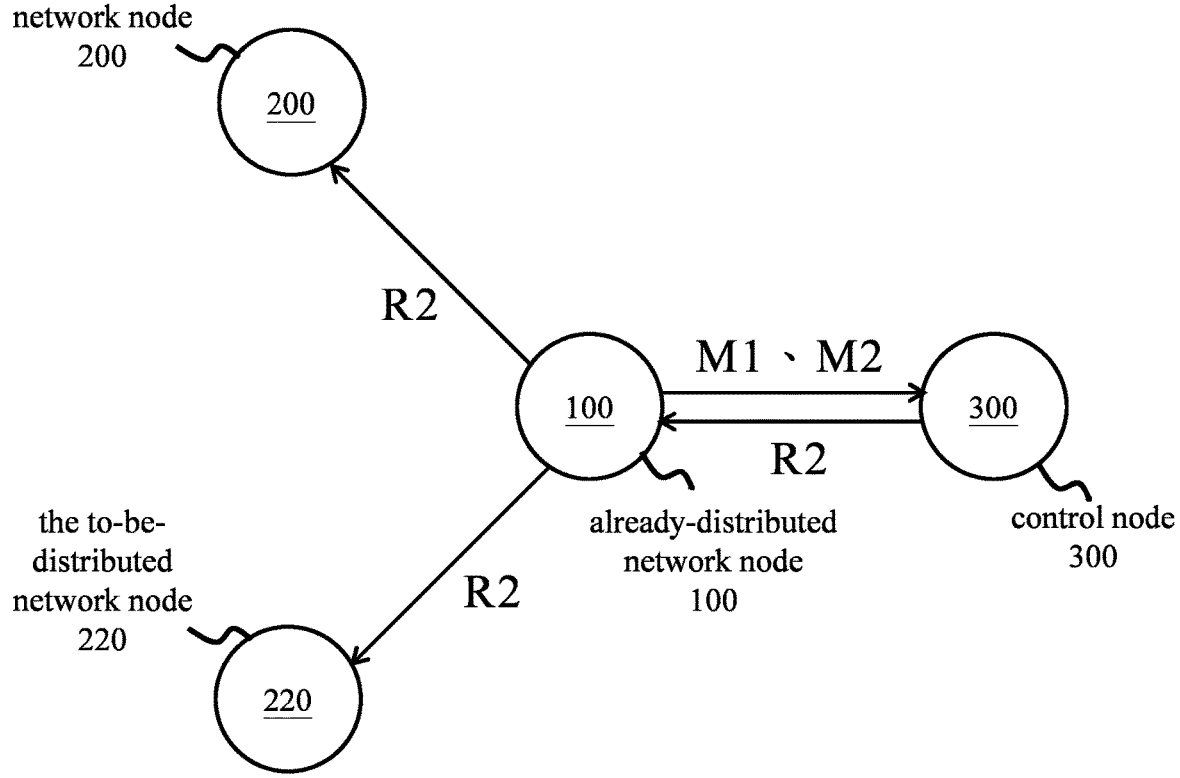
FIG. 4 is a schematic diagram of a distribution network response of the distribution network system according to some embodiments of the present invention.

FIG. 3 is a schematic diagram of a distribution network request of the distribution network system according to some embodiments of the present invention, and FIG. 4 is a schematic diagram of a distribution network response of the distribution network system according to some embodiments of the present invention. Referring to FIG. 3 and FIG. 4, in some embodiments, the distribution network system 10 further includes a to-be-distributed network node 220. The to-be-distributed network node 220 is configured to alternately monitor whether the mesh network beacon S1 is detected on each communication channel CH0. The to-be-distributed network node 220 outputs another distribution network request message M2 to the already-distributed network node 100 according to the mesh network beacon S1, the to-be-distributed network node 220 monitors the distributable network channel CH1 to determine whether a distribution network response message R2 corresponding to the distribution network request message M2 is detected on the distributable network channel CH1, and the to-be-distributed network node 220 joins the mesh network 20 according to the distribution network response message R2. The already-distributed network node 100 is configured to forward the distribution network request message M1 and the distribution network request message M2 to the control node 300. The control node 300 generates the distribution network response message R2 according to the distribution network request message M1 and the distribution network request message M2. Specifically, the to-be-distributed network node 220 can be considered as another to-be-distributed network node (similar to the to-be-distributed network node 200 of the foregoing embodiments) of the distribution network system 10, the distribution network request message M2 is a distribution network request message (similar to the distribution network request message M1 of the foregoing embodiments) outputted by the to-be-distributed network node 220, and the distribution network response message R2 is a distribution network response message (similar to the distribution network response message R1 of the foregoing embodiments) corresponding to the distribution network request message M2. It is noted that, when the control node 300 receives the distribution network request message M1 and the distribution network request message M2 that are forwarded on the same communication channel CH0 by the same already-distributed network node 100, the control node 300 can generate the distribution network response message R2 according to both the distribution network request message M1 and the distribution network request message M2. That is, in some embodiments, the control node 300 can combine a plurality of the distribution network response messages R1 to generate a single distribution network response message R2, and use the single distribution network response message R2 to replace the plurality of the distribution network response messages R1 as a response. In other words, for a plurality of to-be-distributed network nodes 200, the distribution network system 10 can distribute a network in a one-to-many operation, thereby achieving a function of simplifying a distribution network procedure.

Figure 5:
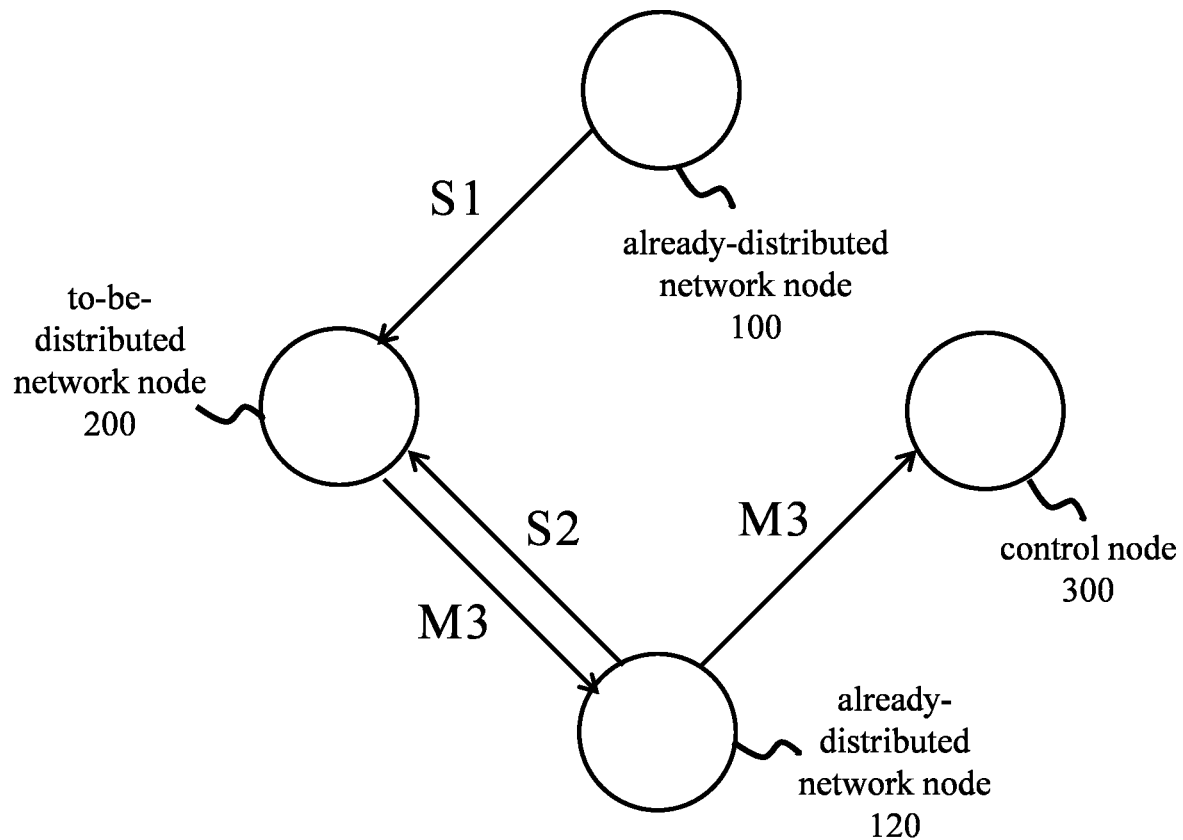
FIG. 5 is a schematic diagram of a distribution network request of the distribution network system according to some embodiments of the present invention.
Figure 6:
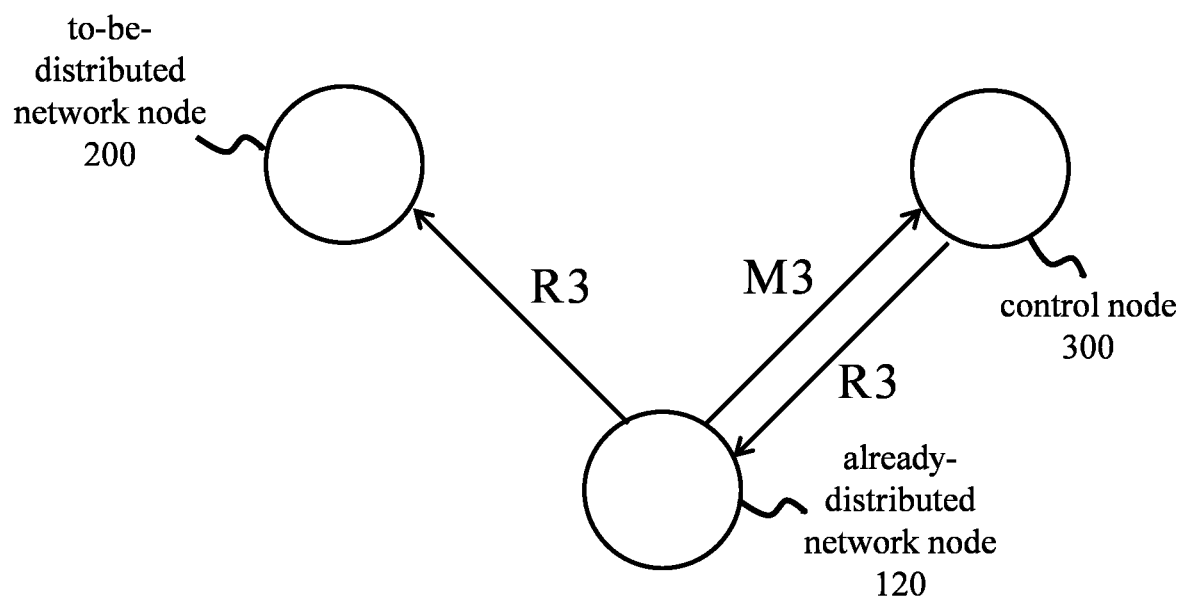
FIG. 6 is a schematic diagram of a distribution network response of the distribution network system according to some embodiments of the present invention.

FIG. 5 is a schematic diagram of a distribution network request of the distribution network system according to some embodiments of the present invention, and FIG. 6 is a schematic diagram of a distribution network response of the distribution network system according to some embodiments of the present invention. Referring to FIG. 5 and FIG. 6, in some embodiments, the distribution network system 10 further includes an already-distributed network node 120. The already-distributed network node 120 is located in the mesh network 20, and the already-distributed network node 120 is configured to broadcast a mesh network beacon S2 to the distributable network channel CH1. In some embodiments, the mesh network beacon S2 corresponds to a type of signal quality, and the foregoing mesh network beacon S1 corresponds to another type of signal quality. The to-be-distributed network node 200 is further configured to alternately monitor whether the mesh network beacon S2 can be detected on each communication channel CH0. When the to-be-distributed network node 200 determines that the signal quality of the mesh network beacon S2 is better than the signal quality of the mesh network beacon S1, the to-be-distributed network node 200 outputs a distribution network request message M3 to the already-distributed network node 120 according to the mesh network beacon S2, and the to-be-distributed network node 200 monitors whether a distribution network response message R3 corresponding to the distribution network request message M3 can be detected on the distributable network channel CH1. If the distribution network response message R3 corresponding to the distribution network request message M3 is detected on the distributable network channel CH1, the to-be-distributed network node 200 joins the mesh network 20 according to the distribution network response message R3. The control node 300 is configured to output the distribution network response message R3. Specifically, the already-distributed network node 120 can be considered as another already-distributed network node (similar to the already-distributed network node 100 of the foregoing embodiments) of the distribution network system 10, the mesh network beacon S2 is a mesh network beacon (similar to the mesh network beacon S1 of the foregoing embodiments) broadcast by the already-distributed network node 120, the distribution network request message M3 is a distribution network request message (similar to the distribution network request message M1 of the foregoing embodiments) corresponding to the mesh network beacon S2, and the distribution network response message R3 is a distribution network response message (similar to the distribution network response message R1 of the foregoing embodiments) corresponding to the distribution network request message M3. It is noted that, when the to-be-distributed network node 200 determines that the signal quality of the mesh network beacon S1 is better than the signal quality of the mesh network beacon S2, the to-be-distributed network node 200 outputs the distribution network request message M1 to the already-distributed network node 100 according to the mesh network beacon S1. The implementation has been described in the foregoing embodiments, and details are not described again.

In some embodiments, the signal quality of the mesh network beacon S1 is the signal strength of the mesh network beacon S1 detected by the to-be-distributed network node 200 when the to-be-distributed network node 200 successfully receives the mesh network beacon S1, not the signal strength that the mesh network beacon S1 was outputted by the already-distributed network node 100. When the to-be-distributed network node 200 receives the mesh network beacon S2, the signal strength of the mesh network beacon S2 detected by the to-be-distributed network node 200 can be used as the signal quality of the mesh network beacon S2. Similarly, it is understood that when the to-be-distributed network node 200 receives a plurality of mesh network beacons S1 corresponding to the same mesh network 20, the to-be-distributed network node 200 can output the corresponding distribution network request message M1 according to the mesh network beacon S1 with the best signal quality.

In some embodiments, the already-distributed network node 100 and the to-be-distributed network node 200 are, for example, but not limited to, Internet of things (IOT) devices or other electronic devices with a network connection function. The control node 300 is, for example, but not limited to, a mobile phone, a notebook computer or other mobile devices. In some embodiments, the control node 300 includes an application program and a control screen. Therefore, a user can operate the control node 300 by using the application program and the control screen, so that the control node 300 can output the corresponding distribution network response message R1.

Figure 7:
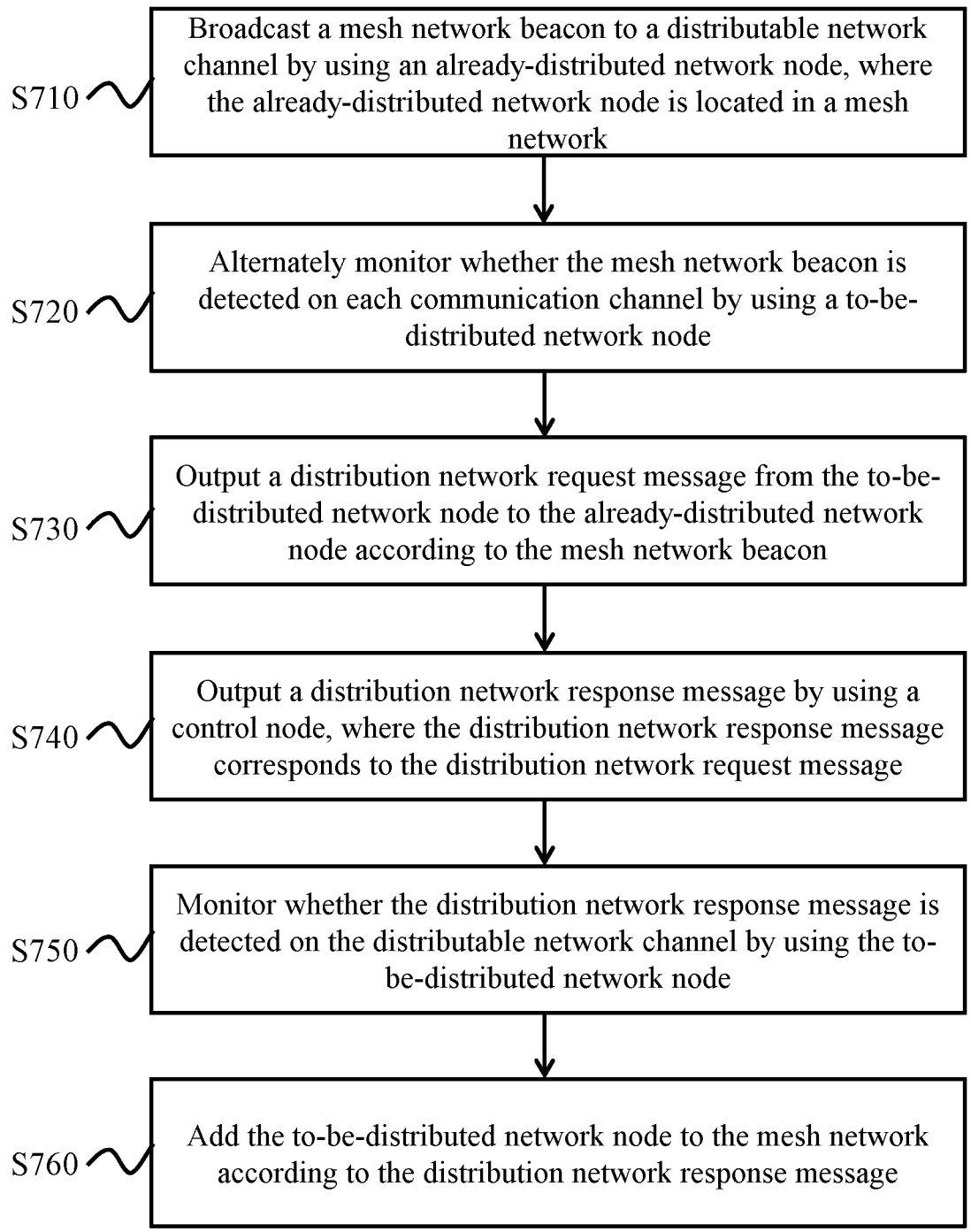
FIG. 7 is a schematic flowchart of a distribution network method according to some embodiments of the present invention.

FIG. 7 is a schematic flowchart of a distribution network method according to some embodiments of the present invention. Referring to FIG. 7, in some embodiments, the distribution network method is adapted to communicatively connect to a mesh network 20, and the mesh network uses one of a plurality of communication channels CH0 as a distributable network channel CH1. The distribution network method includes the following steps: broadcasting a mesh network beacon S1 to the distributable network channel CH1 by using an already-distributed network node 100, where the already-distributed network node 100 is located in the mesh network 20 (step S710); alternately monitoring whether the mesh network beacon S1 is detected on each communication channel CH0 by using a to-be-distributed network node 200 (step S720); outputting a distribution network request message M1 from the to-be-distributed network node 200 to the already-distributed network node 100 according to the mesh network beacon S1 (step S730); outputting a distribution network response message R1 by using a control node 300, where the distribution network response message R1 corresponds to the distribution network request message M1 (step S740); monitoring whether the distribution network response message R1 is detected on the distributable network channel CH1 by using the to-be-distributed network node 200 (step S750); and adding the to-be-distributed network node 200 to the mesh network 20 according to the distribution network response message R1 (step S760).

In conclusion, according to the distribution network system and method in some embodiments of the present invention, the distribution network system can assist the to-be-distributed network node in distributing the network through the already-distributed network node located in the mesh network, and can output the distribution network response message corresponding to the distribution network request message by using the control node, to achieve the function of distributing the network. In some embodiments, a control node can distribute a network for a plurality of different to-be-distributed network nodes by using a single distribution network response message, to achieve a one-to-many distribution network connection, thereby achieving a function of simplifying a distribution network procedure. In some embodiments, a to-be-distributed network node stores a private key, and therefore a distribution network response message cannot be decrypted by an already-distributed network node or other to-be-distributed network nodes, so that a function of encrypting the distribution network can be achieved.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A distribution network system, having a plurality of communication channels, wherein the distribution network system is communicatively connected to a mesh network, the mesh network uses one of the plurality of communication channels as a distributable network channel, and the distribution network system comprises:

a first already-distributed network node, located in the mesh network, and configured to broadcast a first mesh network beacon to the distributable network channel;

a first to-be-distributed network node, configured to alternately monitor whether the first mesh network beacon is detected on each communication channel, wherein the first to-be-distributed network node outputs a first distribution network request message to the first already-distributed network node according to the first mesh network beacon, monitors whether a first distribution network response message corresponding to the first distribution network request message is detected on the distributable network channel, and joins the mesh network according to the first distribution network response message; and a control node, configured to output the first distribution network response message.

2. He distribution network system according to claim 1, wherein the first already-distributed network node is configured to forward the first distribution network request message to the control node, the control node generates the first distribution network response message according to the first distribution network request message, and transmits the first distribution network response message back to the first already-distributed network node, and the first already-distributed network node is further configured to broadcast the first distribution network response message to the distributable network channel.

3. The distribution network system according to claim 1, wherein the first to-be-distributed network node stores a public key and a private key that correspond to each other, and the first distribution network request message comprises to-be-distributed network data and the public key;
   wherein the control node generates distribution network data according to the to-be-distributed network data, uses the public key to encrypt the distribution network data to generate encrypted data, and generates the first distribution network response message according to the to-be-distributed network data and the encrypted data; and
   wherein the first to-be-distributed network node receives the first distribution network response message according to the to-be-distributed network data in the first distribution network response message, uses the private key to decrypt the encrypted data in order to obtain the distribution network data, and joins the mesh network according to the distribution network data.

4. The distribution network system according to claim 1, wherein the first to-be-distributed network node monitors the distributable network channel in a stay duration, and adjusts, according to whether the first mesh network beacon is detected in the distributable network channel, the stay duration corresponding to the distributable network channel.

5. The distribution network system according to claim 1, wherein the first to-be-distributed network node stores a distributable network list, the distributable network list is configured to record the first mesh network beacon and the distributable network channel, and the first to-be-distributed network node outputs the first distribution network request message to the distributable network channel according to the distributable network list.

6. The distribution network system according to claim 1, further adapted to a wireless access point, wherein the wireless access point operates on the distributable network channel, and the mesh network is communicatively connected to the control node through the wireless access point.

7. The distribution network system according to claim 1, further comprising a wireless access point, wherein the wireless access point operates on the distributable network channel, and the mesh network is communicatively connected to the control node through the wireless access point.

8. The distribution network system according to claim 1, further comprising:
   a second to-be-distributed network node, configured to alternately monitor whether the first mesh network beacon is detected on each communication channel, wherein the second to-be-distributed network node outputs a second distribution network request message to the first already-distributed network node according to the first mesh network beacon, monitors whether a second distribution network response message corresponding to both the first distribution network request message and the second distribution network request message is detected on the distributable network channel, and joins the mesh network according to the second distribution network response message; and
   wherein, the first already-distributed network node is configured to forward the first distribution network request message and the second distribution network request message to the control node, and the control node generates the second distribution network response message according to both the first distribution network request message and the second distribution network request message.

9. The distribution network system according to claim 1, further comprising:
   a second already-distributed network node, located in the mesh network, and configured to broadcast a second mesh network beacon to the distributable network channel, wherein the first mesh network beacon corresponds to first signal quality and the second mesh network beacon corresponds to second signal quality;
   wherein the first to-be-distributed network node is further configured to alternately monitor whether the second mesh network beacon is detected on each communication channel, and when the first to-be-distributed network node determines that the second signal quality is better than the first signal quality, the first to-be-distributed network node outputs a third distribution network request message to the second already-distributed network node according to the second mesh network beacon, monitors whether a third distribution network response message corresponding to the third distribution network request message is detected on the distributable network channel, and joins the mesh network according to the third distribution network response message; and
   wherein the control node is configured to output the third distribution network response message.

10. A distribution network method, adapted to communicatively connect to a mesh network, wherein the mesh network uses one of a plurality of communication channels as a distributable network channel, and the distribution network method comprises:
   broadcasting a mesh network beacon to the distributable network channel by using an already-distributed network node, wherein the already-distributed network node is located in the mesh network;
   alternately monitoring whether the mesh network beacon is detected on each communication channel by using a to-be-distributed network node;
   outputting a distribution network request message from the to-be-distributed network node to the already-distributed network node according to the mesh network beacon;
   outputting a distribution network response message by using a control node, wherein the distribution network response message corresponds to the distribution network request message;
   monitoring whether the distribution network response message is detected on the distributable network channel by using the to-be-distributed network node; and
   adding the to-be-distributed network node to the mesh network according to the distribution network response message.

* * * * *